United States Patent [19]  [11] 3,886,281
Bilbao  [45] May 27, 1975

[54] METHOD AND COMPOSITION FOR INHIBITING THE AFTER EFFECTS OF DRUNKENNESS CAUSED BY CONSUMING ALCOHOLIC BEVERAGES

[75] Inventor: Benjamin Bilbao, Maspeth, N.Y.

[73] Assignee: Nolte and Nolte, Jericho, N.Y. ; a part interest

[22] Filed: Sept. 13, 1973

[21] Appl. No.: 396,913

Related U.S. Application Data

[63] Continuation-in-part of Ser. No. 189,329, Oct. 14, 1971, abandoned, which is a continuation-in-part of Ser. No. 89,064, Nov. 12, 1970, abandoned.

[52] U.S. Cl. .............................................. 424/278
[51] Int. Cl. ............................................ A61u 27/80
[58] Field of Search .................................... 424/278

[56] References Cited
OTHER PUBLICATIONS

Chem. Abst., Vol. 72, 20348J (1970).
Goth, A., Medical Pharmacology, 4th Ed., (1968), p. 282.
Sollmann, T., A Manual of Pharmacology, 8th Ed. (1957), pp. 860, 929 & 930.

*Primary Examiner*—Stanley J. Friedman
*Attorney, Agent, or Firm*—Nolte and Nolte

[57] ABSTRACT

An alcoholic beverage containing paraldehyde in a proportion effective to inhibit the after-effects of drunkenness caused by consuming the beverage.

18 Claims, No Drawings

METHOD AND COMPOSITION FOR INHIBITING THE AFTER EFFECTS OF DRUNKENNESS CAUSED BY CONSUMING ALCOHOLIC BEVERAGES

This is a continuation-in-part of application Ser. No. 189,329, filed Oct. 14, 1971, now abandoned, which, in turn, is a continuation-in-part of application Ser. No. 89,064, filed Nov. 12, 1970, now abandoned.

This invention relates to a method and composition for inhibiting the after effects, commonly known as "hangover," of drunkenness caused by consuming alcoholic beverages.

All alcoholic beverages being made today, including distilled liquors, beers and wines, have the shortcoming of causing physiological after effects when consumed in sufficient quantity to cause drunkenness, such after effects or hangover including headache, nausea, vomiting, flushing, loss of appetite, laziness, aversion to noises, poor mental activity level, depression, tremors and the like. There are also the general effects of physical weakness, decrease of reasoning ability and decrease of will power.

It is an object of the present invention to inhibit hangover and its attendant discomforts.

According to the invention, paraldehyde is consumed, or, more generally speaking, internally administered, as the alcoholic beverage is consumed and in a proportion relative to the quantity of alcoholic beverage consumed effective to inhibit hangover. Conveniently, the paraldehyde may be mixed with the alcoholic beverage itself in the aforementioned proportion.

According to another aspect of the invention, the alcoholic beverage may also contain an antioxidant, such as propyl gallate, for the paraldehyde in such proportion relative to the paraldehyde as to inhibit oxidation of the paraldehyde in the atmosphere. Generally, the proportion of antioxidant will not exceed about 0.01 percent by weight of the paraldehyde.

The principal alcohol of each of the alcoholic beverages is, of course, ethyl alcohol. While it is not intended to limit the scope of the invention by any theory, the following is offered as a possible explanation of the effectiveness of paraldehyde as a hangover inhibitor when consumed with the alcoholic beverage. The metabolism of ethyl alcohol in humans is known to involve two oxidations, first the conversion of ethyl alcohol to acetaldehyde and then the conversion of acetaldehyde to acetic acid. In either case, the oxidation takes place by dehydrogenation of the alcohol or the acetaldehyde by means of specific enzymes. Since acetaldehyde is regarded as the main compound responsible for the intoxicating effects of alcoholic beverages consumption, it appears that the detoxicating action of the paraldehyde is primarily due to a promoting of a fastener than normal rate of dehydrogenation of acetaldehyde by means of an unknown enzymatic system.

In the following table are set forth for various types of alcoholic beverages dosages of paraldehyde according to the invention.

| Type of Alcoholic Beverage | Paraldehyde, micrograms per liter of finished alcoholic beverage | |
|---|---|---|
| | Broad range | Preferred range |
| Distilled liquors, either aged or non-aged, i.e., whiskies, brandies, rums, tequilas, and the like | 0.01–1.00 | 0.10–0.25 |
| Wines | 0.01–0.50 | 0.05–0.20 |
| Beers | 0.01–0.20 | 0.01–0.05 |

Both the broad and preferred ranges in the foregoing table are approximate, the broad ranges representing safe and effective dosages with a very large margin of safety and the preferred ranges representing the dosages for optimum results without waste of paraldehyde. The distilled liquors in the foregoing table contain about 20 to about 60 percent by volume ethyl alcohol. The wines in the foregoing table contain about 10 to about 20 percent by volume ethyl alcohol. The beers in the foregoing table contain about 3½ percent by volume ethyl alcohol. It should be understood that these are merely by way of example and that optimum dosages for other alcoholic beverages may be determined by simple and safe experimentation.

As noted above, the ranges in the table are based on safety and effectiveness. Thus, for example, in the case of distilled liquors, a paraldehyde concentration of 0.05 microgram per liter results in freedom from hangover in about 50 percent of persons, 0.10–0.25 microgram per liter results in freedom from hangover in about 80 percent of persons, 0.25–1.00 microgram per liter is no more effective than 0.10–0.25 microgram per liter and the use of concentrations over 1.00 micrograms per liter would, therefore, appear to be pointless. It has been found, however, that when the beverage also contains antioxidant for the paraldehyde, such as propyl gallate, increases in effectiveness may be observed up to concentrations tenfold higher than the foregoing, viz. proportions of paraldehyde up to 10 micrograms per liter of distilled liquors, up to 5 micrograms per liter of wine and up to 2 micrograms per liter of beer.

It can be seen from the table that paraldehyde is a very potent hangover inhibitor since the required dosages are generally extremely small. For this reason, it may not be practical to directly add pure paraldehyde to the alcoholic beverages. Instead, it may be advantageous for the sake of accuracy and ease of handling to work with an appropriate standard solution of paraldehyde dissolved in a suitable solvent. Suitable solvents are, for example, distilled water, ethanol-water mixture of the same concentration of ethanol as the alcoholic beverage in question, the alcoholic beverage itself, neutral spirit (i.e., ethanol-water mixture of about 95% by volume ethanol) and absolute ethanol. Neutral spirit is preferred due to its sterilizing action on the paraldehyde solution prepared therefrom.

A standard solution of paraldehyde in neutral spirit may be prepared as follows. 1 ml. of very pure paraldehyde, substantially free from peroxides, is accurately measured, preferably by using a pipette having a total capacity of one ml, and then diluted with neutral spirit to make up a volume of 100 mls. This solution contains paraldehyde in a concentration of 0.01 g. per ml. One ml. of this solution is diluted exactly as before and the resultant second solution contains 0.0001 g. of paraldehyde per ml. Finally, one ml. of this second solution is diluted exactly as before and the resultant solution contains 0.000001 g. of paraldehyde per ml., i.e., one microgram of paraldehyde per ml. Of course, solutions in any other solvent may be prepared in exactly analogous manner.

The standard solution of paraldehyde thus prepared is ready for use. The next step is to use the foregoing table as a practical guide to calculate how much of the standard solution is to be needed for a given volume of the alcoholic beverage and the calculated amount of the standard solution is added directly to the alcoholic beverage. This is carried out at room temperature and with good agitation because thorough mixing is necessary.

Well known commercial brands of alcoholic beverages were chosen as test specimens of the three groups listed in the foregoing table. The specimens were opened and the calculated volume of the standard alcoholic solution of paraldehyde, above described, was incorporated in each of the alcoholic beverages in its bottle to give a paraldehyde concentration at the midpoint of the preferred range. Finally, each bottle was vigorously agitated to effect a thorough mixing. A parallel set of test specimens were prepared and left aside for an 18 month period after the addition of paraldehyde and at the end of that time they were used in consumption tests to check the effect of the paraldehyde inhibitor after a reasonable amount of time of residence in the bottle of liquor.

The tests of both the fresh and the stored specimens consisted in each of several average person's drinking sufficient quantity of a test specimen at an average rate for an average person to feel the effect of alcoholic drunkenness and then stopping at that point. It turned out that in the case of test specimens having an alcoholic content of above 40 percent by volume, the consumption under the aforementioned criteria was about 300 milliliters over a period of about four hours.

The results of the tests were as follows. The characteristics of the alcoholic beverage, such as its aroma and flavor, are not effected by the quantities of paraldehyde involved. Drunkenness developed at a normal rate. The amount of the test beverage, with the paraldehyde incorporated in it, that was consumed by each person until the test was finished came out to be about the same as the same person would ordinarily consume of the same beverage, without paraldehyde, before becoming drunk. The test subjects reported a definite improvement in mental control throughout the development of drunkenness with the use of paraldehyde as compared with drunkenness in the absence of paraldehyde. Most of the subjects reported the absence of hangover symptoms with which they were familiar. The subjects reported no side-effects This was corroborated by tests throughout the broad and preferred ranges, including the extremities thereof. Test specimens stored for eighteen months were found to give the same results as fresh test specimens.

On the other hand, it is not asserted that the incorporation of paraldehyde into alcoholic beverages is a panacea for the effects of excessive drinking. There may be situations in which drinking paraldehyde-containing alcoholic beverages of the present invention beyond the level of reasonable drunkenness for a particular person may well result in a sleepy or drowsy feeling instead of hangover, as a result of the accumulation of alcohol in the body being greater than what the paraldehyde can completely counteract. Apart from this, there might be interfering conditions which would adversely affect the fullest extent of hangover inhibition, such as gastric or liver disturbances or a headache source other than the hangover per se.

While long term testing would be necessary to corroborate this, it is speculated that the present invention may mitigate the physical debilitation characteristic of alcoholism, which physical debilitation is the result of the cumulative toxic effect of the alcohol.

While the invention has been described by reference to specific embodiments thereof, it is to be understood that such description is by way of example and is not intended as a limitation upon the scope of the invention as described by the appended claims.

What is claimed is:

1. An alcoholic beverage containing paraldehyde in a proportion effective to inhibit the after effects of drunkenness caused by consuming the beverage.

2. Distilled liquor according to claim 1, containing about 0.01 to about 10 micrograms of paraldehyde per liter of the liquor.

3. Distilled liquor according to claim 2, containing about 0.10 to about 0.25 microgram of paraldehyde per liter of the liquor.

4. Wine according to claim 1, containing about 0.01 to about 5 micrograms of paraldehyde per liter of the wine.

5. Wine according to claim 4, containing about 0.05 to about 0.20 microgram of paraldehyde per liter.

6. Beer according to claim 1, containing about 0.01 to about 2 micrograms of paraldehyde per liter of the beer.

7. Beer according to claim 6, containing about 0.01 to about 0.05 microgram of paraldehyde per liter.

8. Alcoholic beverage according to claim 1, also containing propyl gallate in a proportion effective to inhibit the oxidation of paraldehyde in the atmosphere.

9. Alcoholic beverage according to claim 8, in which the proportion of the propyl gallate relative to the paraldehyde is up to about 0.01 percent by weight.

10. Method of inhibiting the after effects of drunkenness caused by consuming an alcoholic beverage, comprising simultaneously drinking with the alcoholic beverage paraldehyde in a dosage, relative to the quantity consumed of the alcoholic beverage, effective to inhibit said after effects.

11. Method according to claim 10, in which the alcoholic beverage consumed is distilled liquor and the dosage of paraldehyde is about 0.01 to about 10 micrograms per liter consumed of the liquor.

12. Method according to claim 10, in which the dosage of paraldehyde is about 0.10 to about 0.25 microgram per liter consumed of the liquor.

13. Method according to claim 10, in which the alcoholic beverage consumed is wine and the dosage of paraldehyde is about 0.01 to about 5 micrograms per liter consumed of the wine.

14. Method according to claim 13, in which the dosage of paraldehyde is about 0.05 to about 0.20 microgram per liter consumed of the wine.

15. Method according to claim 10, in which the alcoholic beverage consumed is beer and the dosage of paraldehyde is about 0.01 to about 2 micrograms per liter consumed of the beer.

16. Method according to claim 15, in which the dosage of paraldehyde is about 0.01 to about 0.05 microgram per liter consumed of the beer.

17. Method according to claim 10, in which the paraldehyde contains propyl gallate in a proportion effective to inhibit the oxidation of paraldehyde in the atmosphere.

18. Method according to claim 17, in which the proportion of the propyl gallate relative to the paraldehyde is up to about 0.01 percent by weight.

* * * * *